UNITED STATES PATENT OFFICE.

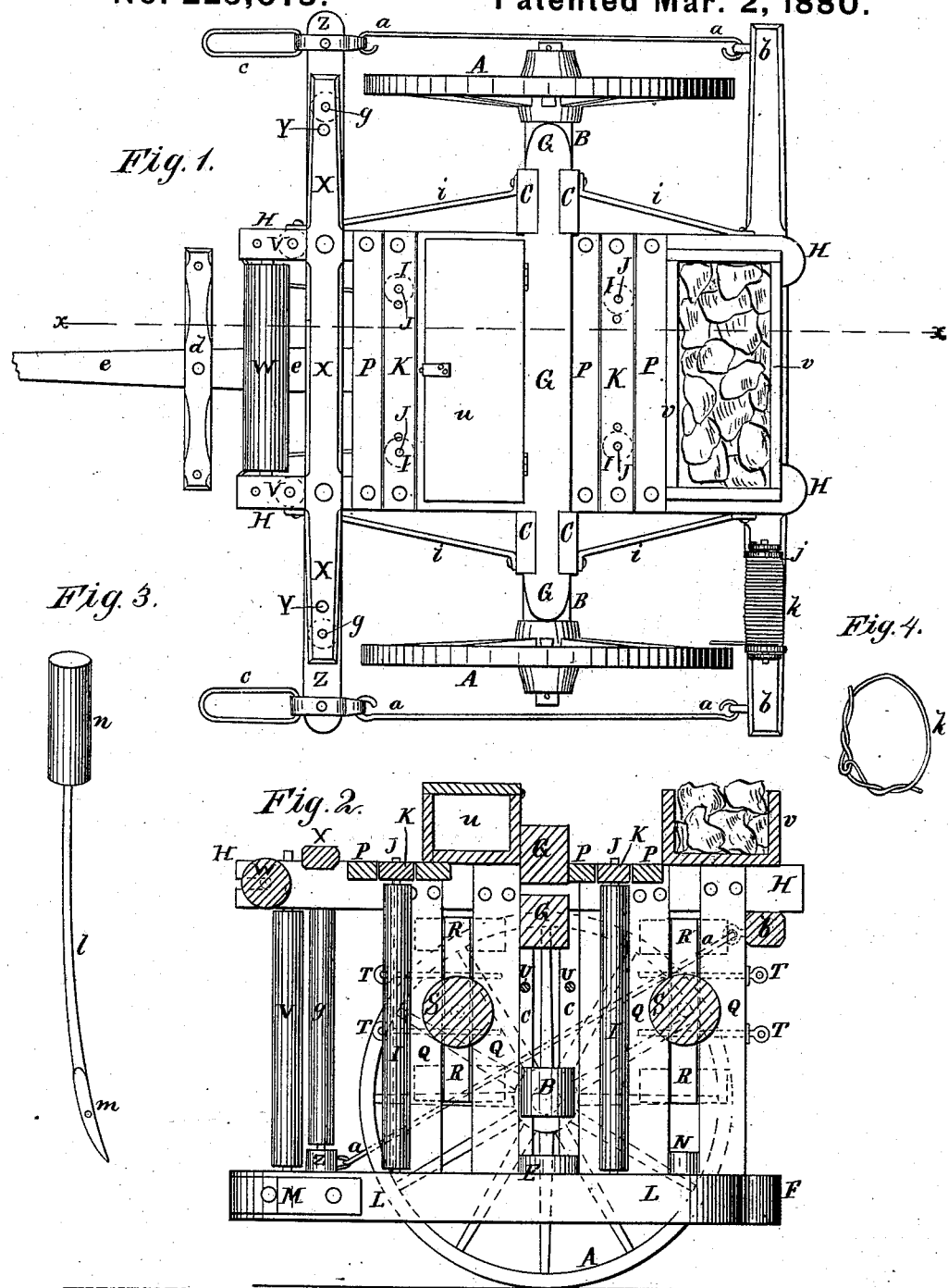

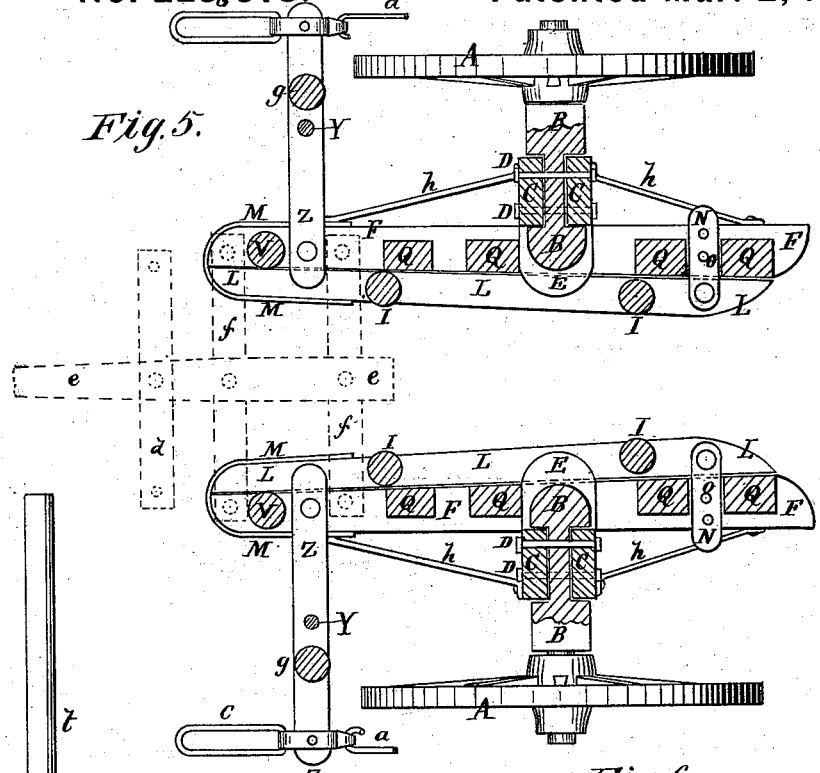
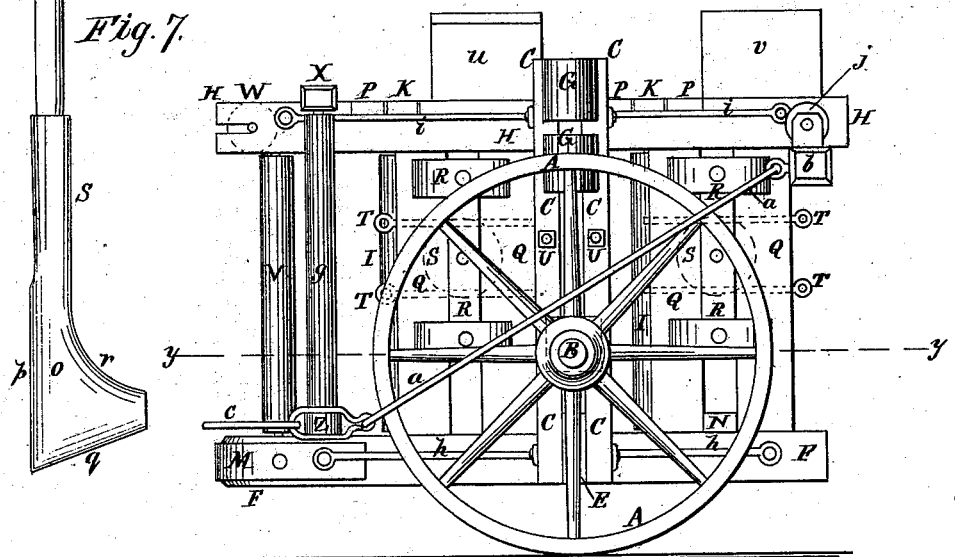

FERDINANDO POOLE, OF EMPORIA, KANSAS.

HEDGE-FENCE LAYERS.

SPECIFICATION forming part of Letters Patent No. 225,073, dated March 2, 1880.

Application filed December 4, 1879

*To all whom it may concern:*

Be it known that I, FERDINANDO POOLE, of Emporia, in the county of Lyon and State of Kansas, have invented a new and useful Improvement in Hedge-Fence Layers, of which the following is a specification.

Figure 1, Sheet 1, is a plan view of my improvement. Fig. 2, Sheet 1, is a sectional side elevation taken through the line $xx$, Fig. 1. Fig. 3, Sheet 1, is a perspective view of the needle. Fig. 4, Sheet 1, is a plan view of the tie. Fig. 5, Sheet 2, is a sectional plan taken through the line $y y$, Fig. 6. Fig. 6, Sheet 2, is a side elevation. Fig. 7, Sheet 2, represents the knife or cutter.

Similar letters of reference indicate corresponding parts.

The object of this invention is to furnish hedge-fence layers so constructed as to lay the plants at any desired compactness and at any desired closeness to the ground.

A represents the wheels, which are placed upon the axles B. The inner part of each axle B is placed between two parallel upright bars, C, to which it is secured by bolts D, several holes being formed in the bars C to receive the bolts D, so that the machine may be adjusted lower or higher, according as the plants are to be laid close to or farther from the ground. The lower ends of the bars C are bolted to the opposite sides of the outer ends of the short bars E, the inner ends of which are secured to the sills F. The upper ends of the bars C are bolted to the opposite sides of the ends of two horizontal cross-bars, G, which are placed the one above the other and at such a distance apart as to receive between them the top side bars, H, of the frame.

I are upright rollers, the upper ends of which revolve upon pivots J attached to cross-bars K. Several holes are formed in the cross-bars K to receive the pivots J, so that the upper ends of the rollers I may be adjusted nearer together or farther apart, according as the hedge-plants are to be pressed together more or less compactly. The ends of the bars K are secured to the side top bars, H. The lower ends of the rollers I are pivoted to the bars L, placed at the inner sides of the sills F. The forward ends of the bars L are connected with the forward ends of the sills F by metal straps M, the elasticity of which allows the rear ends of the bars L to be adjusted nearer together or farther apart, according as the hedge-plants are to be pressed together more or less compactly. To the forward ends of the hinged bars L are attached arms N, which rest upon the upper sides of the rear parts of the sills F, and have a number of holes formed through them to receive the pins or bolts O, by which they are secured to the said sills F, so that the bars L and rollers I may be held securely in any position into which they may be adjusted. The top bars, H, are connected by cross-bars P. The sills F and the top bars, H, are connected upon each side of the machine by two pairs of upright bars, Q. In the space between the bars Q of each pair are placed sliding blocks R, to which are pivoted the ends of two rollers, S. The slides R are secured in position by pins or bolts T passed through them and through the bars Q. Several holes are formed through the bars Q to receive the fastening pins or bolts T, so that the slides R and rollers S may be adjusted lower or higher, according as it may be desired to lay the hedge-plants more or less close to the ground.

The frame of the machine is strengthened by two tie-rods, U, passing across it and through the bars C, which rods have nuts screwed upon their ends.

To the forward ends of the sills F and top side bars, H, are pivoted two upright rollers, V, and to the forward ends of the side top bars, H, is pivoted a horizontal roller, W. The rollers V V W guide the hedge-plants into the cavity of the machine, where they are pressed together and pressed down by the rollers I S.

To the upper side of the forward parts of the side top bars, H, is attached a cross-bar, X, the ends of which project at the sides of the machine. To the bar X, at a little distance from its ends, are attached the upper ends of the tie-rods Y, the lower ends of which are attached to the draft-bars Z. The inner ends of the draft-bars Z are bolted to the forward parts of the sills F just in the rear of the rollers V. The draft-bars Z are supported against the draft-strain by the rods $a$, the forward ends of which are secured to the outer ends of the draft-bars Z by clips, bands, or other suitable means. The rods $a$ incline upward, and their rear ends are attached to the projecting ends of a cross-bar, b, attached to the rear end of the top side bars, H.

To the outer ends of the draft-bars Z, or to the clips or bands that secure the ends of the rods a to said ends, are attached loops c or clevises, to receive the whiffletrees when the machine is being used. When the machine is being drawn from place to place the whiffletrees are attached to the ends of the doubletree d, which is pivoted to the tongue e.

To the rear part of the tongue e are attached the centers of two cross-bars, f, the ends of which are bolted to the forward parts of the sills F. The tongue e and cross-bars f are detached when the machine is at work.

To and between the draft-bar Z and the end parts of the cross-bar X are pivoted the upright rollers g, which act as guides to bring outspreading limbs into position to enter the cavity of the machine and as guards to protect the wheels from the said limbs. The framework of the machine is stiffened and strengthened by the braces h i. The inner ends of the braces h are attached to the lower ends of the bars C, and the outer ends of the said braces are attached to the end parts of the sills F. The inner ends of the braces i are attached to the upper parts of the bars C, and the outer ends of the said braces are attached to the end parts of the top side bars, H.

To an arm of the cross-bar b is pivoted a spool, j, to carry wire k for tying the plants after being bent down. The wire k is passed around the plants, is looped together, and its ends are twisted around its body, as shown in Fig. 4. The wire k is passed around the plants by means of a long needle, l, which is slightly curved, has a hole, m, formed through it near its point, to receive the wire k, and has a handle, n, attached to its other end for convenience in using it.

When the hedge-plants are large or stiff they are nicked near the ground, to cause them to bend more readily, by means of the knife or cutter o, which is made with a straight longitudinal edge, p, a diagonal or inclined edge, q, and a curved or hooked edge, r, as shown in Fig. 7. In the base of the cutter o is formed a socket, s, to receive a handle, t. With a cutter thus constructed the stem of the plant can be readily nicked, however covered by overlying plants.

To the top side bars, H, in front of the crossbars G, is attached a tool-box, u, and to the rear parts of the side top bars, H, is attached a box, v, to receive stones or other heavy substances to give additional weight to the machine when required.

I am aware that most of the devices herein described are severally old, and I hereby disclaim the subject-matter of Patent No. 195,046.

What I claim as new is—

In a hedge-fence layer, the combination, with the sulky-frame carrying the rollers I, g, V, and W, of the slides R, bolts T, and the horizontal independently-adjustable rollers S, as and for the purpose described.

FERDINANDO POOLE.

Witnesses:
DANIEL SEVERY,
ASA R. BANCROFT.